United States Patent
Hoehn et al.

(10) Patent No.: US 9,266,056 B2
(45) Date of Patent: Feb. 23, 2016

(54) PROCESS FOR INITIATING OPERATIONS OF A SEPARATION APPARATUS

(71) Applicant: UOP, LLC, Des Plaines, IL (US)

(72) Inventors: Richard Hoehn, Mt. Prospect, IL (US); Shannon Maureen Sullivan, Chicago, IL (US); Krishnan Vaidyanathan, Haryana (IN)

(73) Assignee: UOP LLC, Des Plaines, IL (US)

( * ) Notice: Subject to any disclaimer, the term of this patent is extended or adjusted under 35 U.S.C. 154(b) by 249 days.

(21) Appl. No.: 13/888,853

(22) Filed: May 7, 2013

(65) Prior Publication Data

US 2014/0336433 A1   Nov. 13, 2014

(51) Int. Cl.
*C10G 70/04* (2006.01)
*B01D 53/14* (2006.01)

(52) U.S. Cl.
CPC ........ *B01D 53/1468* (2013.01); *B01D 53/1412* (2013.01); *C10G 70/04* (2013.01)

(58) Field of Classification Search
None
See application file for complete search history.

(56) References Cited

U.S. PATENT DOCUMENTS

| | | |
|---|---|---|
| 3,130,006 A | 4/1964 | Rabo et al. |
| 4,363,718 A | 12/1982 | Klotz |
| 5,062,270 A | 11/1991 | Haut et al. |
| 5,688,736 A | 11/1997 | Seamans et al. |
| 6,291,391 B1 | 9/2001 | MacArthur |
| 6,712,880 B2 | 3/2004 | Foglietta et al. |
| 7,074,971 B2 | 7/2006 | Van Egmond et al. |
| 7,485,275 B2 | 2/2009 | Asprion et al. |
| 2008/0092590 A1 | 4/2008 | Yearout |
| 2011/0163010 A1* | 7/2011 | Lee et al. ...................... 208/210 |
| 2011/0240518 A1* | 10/2011 | Podrebarac et al. ............ 208/59 |
| 2013/0043159 A1* | 2/2013 | Hoehn et al. .................... 208/95 |
| 2013/0043162 A1 | 2/2013 | Hoehn et al. |
| 2013/0045142 A1 | 2/2013 | Hoehn et al. |

* cited by examiner

*Primary Examiner* — Tam M Nguyen
(74) *Attorney, Agent, or Firm* — James C. Paschall

(57) ABSTRACT

One exemplary embodiment can be a process for initiating operations of a separation apparatus. The process may include passing a hydrocarbon carrier having a sulfiding agent through an exchanger for heating the hydrocarbon carrier prior to entering a stripper.

17 Claims, 2 Drawing Sheets

PROCESS FOR INITIATING OPERATIONS OF A SEPARATION APPARATUS

FIELD OF THE INVENTION

This invention generally relates to a process for initiating operations of a separation apparatus.

DESCRIPTION OF THE RELATED ART

During initial start-up of a fractionation column downstream of a hydroprocessing reactor, hydrogen sulfide can accumulate in the column while sulfiding the hydroprocessing catalyst. This accumulation typically occurs due to insufficient temperature present in a stripper upstream from the fractionation column, which is typically at a lower pressure than the stripper. Usually, the stripper removes hydrogen sulfide, but during start-up the stripper typically is cooler than during normal operations for efficiently removing the hydrogen sulfide. As a result, hydrogen sulfide can accumulate in the bottom of the stripper and subsequently in the fractionation column and contaminate product from the initial runs and increase corrosion in the column, which often is not constructed of material sufficiently resistant to hydrogen sulfide. Often, product has to be recycled until the hydrogen sulfide is purged from the fractionation column.

One possible solution can be to utilize a fractionator heater to increase the recirculation temperature that may result in a slightly increased heating rate to the reactor. However, this can result in cavitation in the charge pump due to high suction temperature. Hence, there is a desire to remove hydrogen sulfide in the stripper during the early phases of the start-up when the feed to the stripper column is not the typical feed and the temperatures of the feed are significantly below normal.

SUMMARY OF THE INVENTION

One exemplary embodiment can be a process for initiating operations of a separation apparatus. The process may include passing a hydrocarbon carrier having a sulfiding agent through an exchanger for heating the hydrocarbon carrier prior to entering a stripper.

Another exemplary embodiment may be a process for initiating operations of a separation apparatus. The process can include passing at least a portion of a bottom stream from a fractionation column upstream of a stripper to combine with at least a portion of a hydroprocessing effluent to provide a heated feed to the stripper.

A further exemplary embodiment can be a process for initiating operations of a separation apparatus. The process can include passing a hydrocarbon carrier including a sulfiding agent through a cold side of an exchanger for heating the hydrocarbon carrier prior to entering a stripper, passing a start-up hydrocarbon through a hot side of an exchanger to heat the hydrocarbon carrier, passing the hydrocarbon carrier from the stripper to a fractionation column, and passing a bottom stream from the fractionation column to the hot side of the exchanger.

One exemplary embodiment can be an exchanger upstream of the stripper used to warm a hydrocarbon carrier with a bottom stream from a fractionation column. Often, the fractionation column and stripper may be initially started with a circulated inventory oil until both are at a sufficient temperature. The circulated inventory oil passes from the fractionation column, to the stripper, to a furnace, and back to the fractionation column. At that point, a carrier including a sulfiding agent may be passed to the cold side of the exchanger while the hot side of the exchanger receives the bottom stream. The carrier, now sufficiently warmed, is passed to the stripper where the stripper can remove the hydrogen sulfide. Afterwards, the carrier can be passed to the fractionation column, where the bottom stream, now including the carrier, may pass to the hot side of the exchanger and continue to warm the incoming carrier on the cold side. Once production is ready, the exchanger can be taken out of service by being isolated, drained, and purged, and the effluent from the hydroprocessing reactor can be directed to the stripper and the fractionation column bottom directed to product inventory.

Alternatively, another exemplary embodiment may be a portion of the start-up inventory oil that can be mixed directly with the carrier prior to entering the stripper. The start-up oil can be sufficiently heated while exiting the fractionation column bottom to heat the carrier material entering the stripper. If a heat exchanger train is placed after the fractionator pump, the recycle oil temperature to the surge drum can be controlled separately. Once production begins, a control valve can cease adding fractionation column material to the feed to the stripper. Also, using a slipstream from the fractionator bottom may ease the stripping steam quantity. Hence by inventorying slightly more oil in the fractionator and firing the fractionator heater can ensure a sufficient stripper inlet temperature. As a result, the fractionator heater can raise the temperature of the stripper feed in both embodiments.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and nonaromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. A "stream" may also be substances, e.g., fluids, other than hydrocarbons, such as hydrogen.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "hydroprocessing" can refer to processing one or more hydrocarbons in the presence of hydrogen, and can include hydrotreating and/or hydrocracking.

As used herein, the term "hydrocracking" can refer to a process breaking or cracking bonds of at least one long-chain hydrocarbon in the presence of hydrogen and at least one catalyst into lower molecular weight hydrocarbons.

As used herein, the term "hydrotreating" can refer to a process including contacting a hydrocarbon feedstock with hydrogen gas in the presence of one or more suitable catalysts for the removal of heteroatoms, such as sulfur, nitrogen and metals from a hydrocarbon feedstock. In hydrotreating, hydrocarbons with double and triple bonds may be saturated, and aromatics may also be saturated, as some hydrotreating processes are specifically designed to saturate aromatics.

As used herein, the term "diesel" can mean a hydrocarbon material boiling in a range of about 130-about 400° C. using the True Boiling Point distillation method, and can include one or more C8-C21 hydrocarbons.

As used herein, the term "hour" may be abbreviated "hr", the term "kilogram" may be abbreviated "kg", the term "kilopascal" may be abbreviated "KPa", the term "megapascal" may be abbreviated "MPa", and the terms "degrees Celsius" may be abbreviated "° C". All pressures are absolute.

As depicted, the process flow lines in the figures can be referred to interchangeably as, e.g., lines, pipes, feeds, branches, oils, portions, products, or streams.

DETAILED DESCRIPTION

Figure 1:
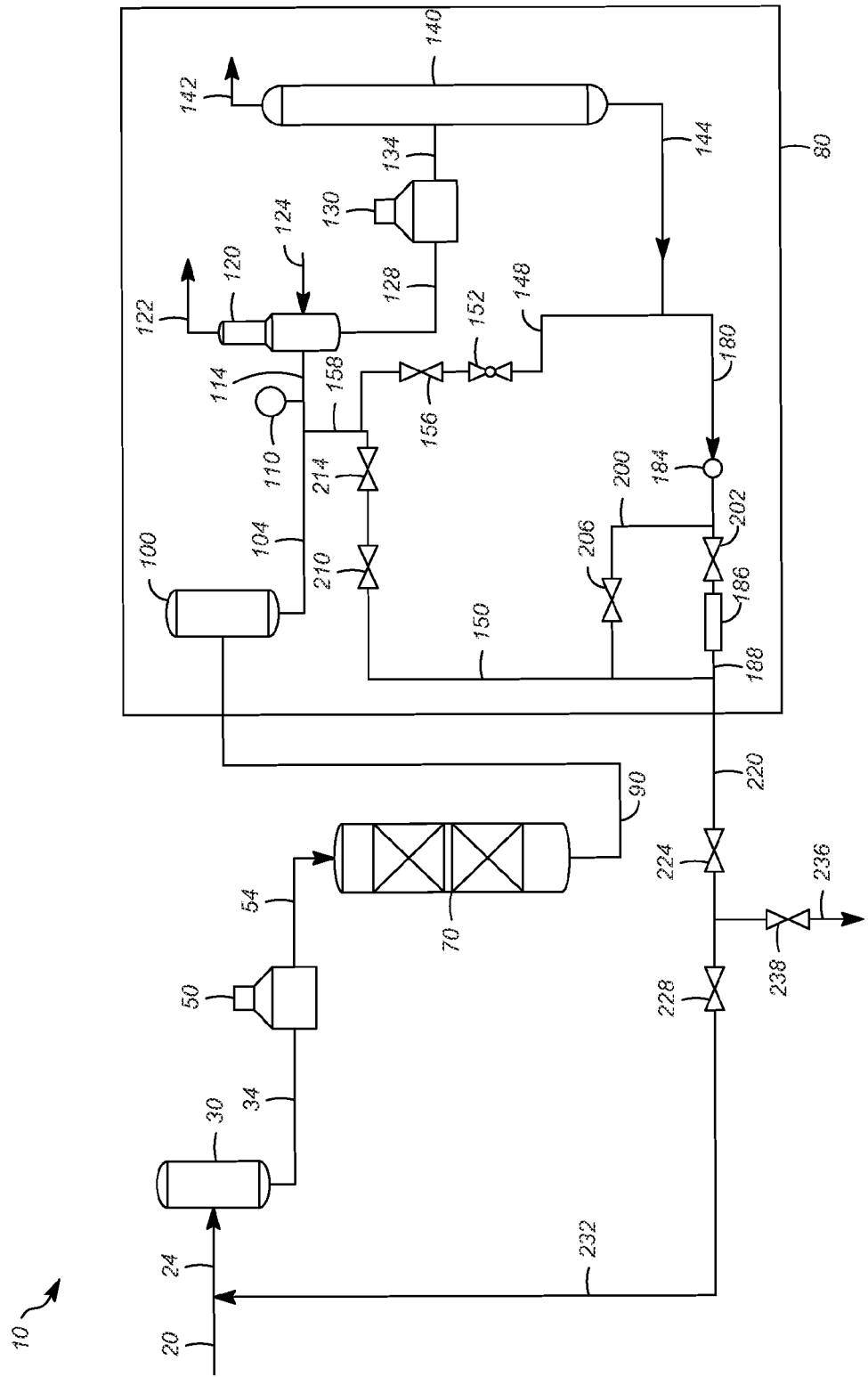
FIG. 1 is a schematic depiction of an exemplary hydroprocessing unit.

Referring to FIG. 1, an exemplary hydroprocessing unit 10 can include a feed surge drum 30, a charge heater 50, a hydroprocessing reactor 70, and a separation apparatus 80. The separation apparatus 80 may include a flash drum 100, a stripper 120, a fractionator charge heater 130, and a fractionator 140. During normal operations, the hydroprocessing unit 10 described herein can be particularly useful for hydroprocessing a hydrocarbonaceous feedstock. Illustrative hydrocarbon feedstocks include hydrocarbonaceous streams having components boiling above about 285° C., such as an atmospheric gas oil, a vacuum gas oil boiling between about 315-about 565° C., a deasphalted oil, a coker distillate, a straight run distillate, a pyrolysis-derived oil, a high boiling synthetic oil, a cycle oil, a hydrocracked feed, a catalytic cracker distillate, an atmospheric residue boiling at or above about 340° C., and a vacuum residue boiling above about 510° C. The feedstock can be provided in a hydroprocessing feed line 20, optionally combined with recycled hydrocarbons from the fractionator 140 in a line 232, and sent via a line 24 to the feed surge drum 30. A hydrogen stream may be combined with the hydrocarbons upstream of the charge heater 50 in a line 34. The combined stream can pass through a line 54 to the hydroprocessing reactor 70.

Hydroprocessing that occurs may be hydrocracking or hydrotreating. Hydrocracking can also include slurry hydrocracking in which resid feed is mixed with catalyst and hydrogen to make a slurry and cracked to lower boiling products.

The hydroprocessing reactor 70 may be a fixed bed reactor including one or more vessels, single or multiple beds of catalyst in each vessel, and various combinations of hydrotreating catalyst and/or hydrocracking catalyst in one or more vessels. It is contemplated that the hydroprocessing reactor 70 be operated in a continuous liquid phase in which the volume of the liquid hydrocarbon feed is greater than the volume of the hydrogen gas. The hydroprocessing reactor 70 may also be operated in a conventional continuous gas phase, a moving bed or a fluidized bed hydroprocessing reactor.

Operating as a hydrocracking reactor at mild hydrocracking conditions can provide about 20-about 60%, preferably about 20-about 50%, by volume, total conversion of the hydrocarbon feed to product boiling below the diesel cut point. If the hydroprocessing reactor 70 is operated as a hydrotreating reactor, it may provide conversion per pass of about 10-about 30%, by volume.

If the hydroprocessing reactor 70 is a hydrocracking reactor, the first vessel or bed in the hydrocracking reactor 70 may include hydrotreating catalyst for the purpose of saturating, demetallizing, desulfurizing, or denitrogenating. Afterwards, the hydrocarbon feed can be hydrocracked with a hydrocracking catalyst in subsequent vessels or beds in the hydrocracking reactor 70. If the hydrocracking reactor is a mild hydrocracking reactor, it may contain several beds of hydrotreating catalyst followed by fewer beds of hydrocracking catalyst. If the hydroprocessing reactor 70 is a slurry hydrocracking reactor, it may operate in a continuous liquid phase in an upflow mode and may appear different than in FIG. 1 which depicts a fixed bed reactor. If the hydroprocessing reactor 70 is a hydrotreating reactor it may include more than one vessel and multiple beds of hydrotreating catalyst. The hydrotreating reactor may also contain hydrotreating catalyst suited for saturating aromatics, hydrodewaxing and hydroisomerization.

A hydrocracking catalyst may utilize amorphous silica-alumina bases or low-level zeolite bases combined with one or more metals of groups 8-10 or group 6 of the periodic table if mild hydrocracking is desired to produce a balance of middle distillate and gasoline. In another aspect, when middle distillate is significantly preferred in the converted product over gasoline production, partial or full hydrocracking may be performed in the hydrocracking reactor 70 with a catalyst that can include, generally, any crystalline zeolite cracking base, which may have deposited one or more metals of groups 8-10 of the periodic table. Additional hydrogenating components may be selected from group 6 for incorporation with the zeolite base.

The zeolite cracking bases can include molecular sieves and are usually composed of silica, alumina and one or more exchangeable cations such as sodium, magnesium, calcium, and rare earth metals. They may be further characterized by crystal pores of relatively uniform diameter between about 4-about 14 Angstroms. It is preferable to employ zeolites having a relatively high silica:alumina mole ratio of about 3-about 12. Suitable zeolites found in nature can include, for example, mordenite, stilbite, heulandite, ferrierite, dachiardite, chabazite, erionite and faujasite. Suitable synthetic zeolites may include, for example, the B, X, Y and L crystal types, e.g., synthetic faujasite and mordenite. One exemplary zeolite is a synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in, e.g., U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 percent, and preferably at least about 20 percent, metal-cation-deficient, based on the initial ion-exchange capacity. In another aspect, a desirable and stable class of zeolites is one wherein at least about 20 percent of the ion exchange capacity is satisfied by hydrogen ions.

The active metals employed in the preferred hydrocracking catalysts as hydrogenation components are those of groups 8-10, i.e., iron, cobalt, nickel, ruthenium, rhodium, palladium, osmium, iridium and platinum. In addition to these metals, other promoters may also be employed in conjunction therewith, including the metals of group 6, e.g., molybdenum and tungsten. The amount of hydrogenating metal in the catalyst can vary within wide ranges. Broadly speaking, any amount between about 0.05-about 30%, by weight, may be used. In the case of the noble metals, it is normally preferred to use about 0.05-about 2%, by weight.

The method for incorporating the hydrogenating metal is to contact the base material with an aqueous solution of a suitable compound of the desired metal, often present in a cationic form. Following the addition of the selected hydrogenating metal or metals, the resulting catalyst powder is then filtered, dried, pelleted with added lubricants, binders or the like if desired, and calcined in air at temperatures of, e.g., about 370-about 650° C. in order to activate the catalyst and decompose ammonium ions. Alternatively, the base component may first be pelleted, followed by the addition of the hydrogenating component and activation by calcining.

The foregoing catalysts may be employed in undiluted form, or the powdered catalyst may be mixed and copelleted with other relatively less active catalysts, diluents or binders such as alumina, silica gel, silica-alumina cogels, and activated clays in proportions ranging from about 5-about 90%, by weight. These diluents may be employed as such or they may contain a minor proportion of an added hydrogenating metal such as a metal of group 6 and/or groups 8-10 of the periodic table. Additional metal promoting hydrocracking catalysts may also be utilized in the process disclosed herein that can include, for example, aluminophosphate molecular sieves, crystalline chromosilicates and other crystalline silicates. Crystalline chromosilicates are more fully described in U.S. Pat. No. 4,363,718.

By one approach, the hydrocracking conditions may include a temperature from about 290-about 470° C., a pressure of about 4-about 21 MPa, a liquid hourly space velocity of about 0.2-about 2.5 $hr^{-1}$, and a hydrogen rate of about 420-about 2,600 $Nm^3/m^3$ oil. If mild hydrocracking is desired, conditions may include a temperature of about 315-about 450° C., a pressure of about 5-about 14 MPa, a liquid hourly space velocity of about 0.5-about 2 $hr^{-1}$, and a hydrogen rate of about 420-about 1,685 $Nm^3/m^3$ oil.

The effluent from the hydroprocessing reactor 70 can pass through an effluent exchange train and one or more drums or separators before passing to the stripper 120. In this exemplary embodiment, the hydroprocessed effluent can pass through a line 90 to the flash drum 100, and then through a line 104 and a line 114 to the stripper. A temperature gauge 110 can measure the temperature of the hydrocarbons entering the stripper 120.

The stripper 120 can be in downstream communication with the hydroprocessing reactor 70 for stripping the hydroprocessing effluent stream. A stripping media that can be an inert gas such as steam can be provided via a steam stream 124. The stripper 120 may be operated with a temperature of about 160-about 360° C., and an overhead pressure of about 0.2-about 2.1 MPa.

A hydrocracked stripped stream in a bottom line 128 may be heated with a process heater 130 and fed to the fractionator 140 via a line 134. The product streams may include an overhead naphtha stream 142, a kerosene stream from a side cut outlet, a diesel stream from another side cut outlet, and an unconverted oil stream in the line 144 that may be suitable for further processing, such as in a fluid catalytic cracking unit, and be provided via a line 236. As an aside, the streams not numbered are not depicted in FIG. 1. The fractionator 140 may be operated with a bottom temperature of about 280-about 385° C., and at an overhead pressure of about 30-about 220 KPa. An exemplary charge heater, hydroprocessing reactor, stripper, a fractionator charge heater, and a fractionator are disclosed in, e.g., US 2013/0043162 and US 2013/0045142.

Frequently, the hydroprocessing unit 10 may be shut down for maintenance or replacement of catalyst in the hydroprocessing reactor 70. Afterwards, the hydroprocessing unit 10 can be restarted. During shut down, often the separation apparatus 80 is inventoried with one or more start-up hydrocarbons or oil. Often, the start-up hydrocarbons include one or more hydrocarbons boiling in the diesel range. Also, after changing out the catalyst in the hydroprocessing reactor 70, the replacement catalyst is often sulfided. Usually, a hydrocarbon carrier having a sulfiding agent is utilized. The hydrocarbon carrier can be a diesel material and the sulfiding agent, such as a sulfiding oil, can be a dimethyl disulfide that dissolves in the diesel material. Usually, the dimethyl disulfide reacts to form hydrogen sulfide at no less than about 230° C.

During the initiation of operations, the start-up hydrocarbons are heated by the fractionator charge heater 130 and circulated through the stripper 120 and the fractionator 140 via the lines 150, 158, 114, 128, 134, 144, 180, and 200. An increased amount of start-up hydrocarbons can be utilized. The valves 206, 210, and 214 can be opened and the valves 152, 156, and 224 may be closed. Next, the hydroprocessing reactor 70 can be initiated and part of the initialization may be sulfiding the catalyst. The sulfiding may be accomplished by providing the hydrocarbon carrier including the sulfiding agent. The hydrocarbon carrier, after exiting the hydroprocessing reactor 70, can pass to the flash drum 100 in the separation apparatus 80 upstream of the stripper 120. If the hydrocarbon carrier enters the stripper 120 without any heating, the hydrocarbon carrier can be about 90-about 125° C. cooler as compared to a hydroprocessed effluent entering the stripper 120. The hydrocarbon carrier can fill the flash drum 100 until a valve is opened allowing the hydrocarbon carrier to mix with the circulating start-up hydrocarbons and pass to the stripper 120. The circulating start-up hydrocarbons can warm the hydrocarbon carrier to a suitable temperature so any hydrogen sulfide along with any recycle gas can exit the top of the stripper 120 via a line 122. The hydrocarbons can exit the bottom of the stripper 120 through the bottom line 128 to the fractionator charge heater 130. Next, the hydrocarbons can pass from the fractionator charge heater 130 through a line 134 to the fractionator 140. Several fractions can be obtained in the fractionator 140 with the lightest fraction including recycle gases exiting as an overhead stream 142 and the hydrocarbons exit as a bottom stream 144.

As hydrocarbon circulation is required for vessels and equipment upstream of the separation apparatus 80, the bottom stream 144 may be split into at least a portion, namely a first portion 148 and another stream or a second portion 180 of the bottom stream 144 by opening the valve 156 and closing the valves 210, 214, and 224. A valve 152 can be a control valve regulating the amount of the first portion 148 passing through a line 158 and combined with the hydrocarbon carrier from the flash drum 100. The amount can be regulated by the temperature of the combined hydrocarbons entering the stripper 120 from the line 114 as measured by the temperature gauge 110. The second portion 180 can pass through an exchanger 184, air cooled exchanger 186, and the lines 220 and 232 by opening the valves 224 and 228 and closing the valve 238. The temperature of the line 232 can be adjusted by changing the opening of the valve 206 so the flow of hot hydrocarbons in the line 200 can mix with the cooled hydrocarbons from the line 188 to provide the desired temperature to the hydrocarbon stream 232. Thus, the hydrocarbons can continue to circulate through the feed surge drum 30, charge heater 50, hydroprocessing reactor 70, and flash drum 100 with a first portion 148 provided to heat the hydrocarbon carrier to a sufficient temperature to drive any hydrogen sulfide through the overhead of the stripper 120 via the line 122. Desirably, the stripper 120 is operated at a temperature of about 175-about 250° C., and about 440-about 1,500 KPa. Once a hydrocarbon feed is provided to the hydroprocessing reactor 70 and normal operations are resumed, a hydroprocessed effluent may be at a preselected temperature for the stripper 120. The valves 152, 156, 206, and 228 can be closed and a valve 238 opened so the bottom material from the fractionator 140 can be routed through the exchanger 184, valve 202, and air cooled exchanger 186 for further processing via lines 188 and 236.

Figure 2:
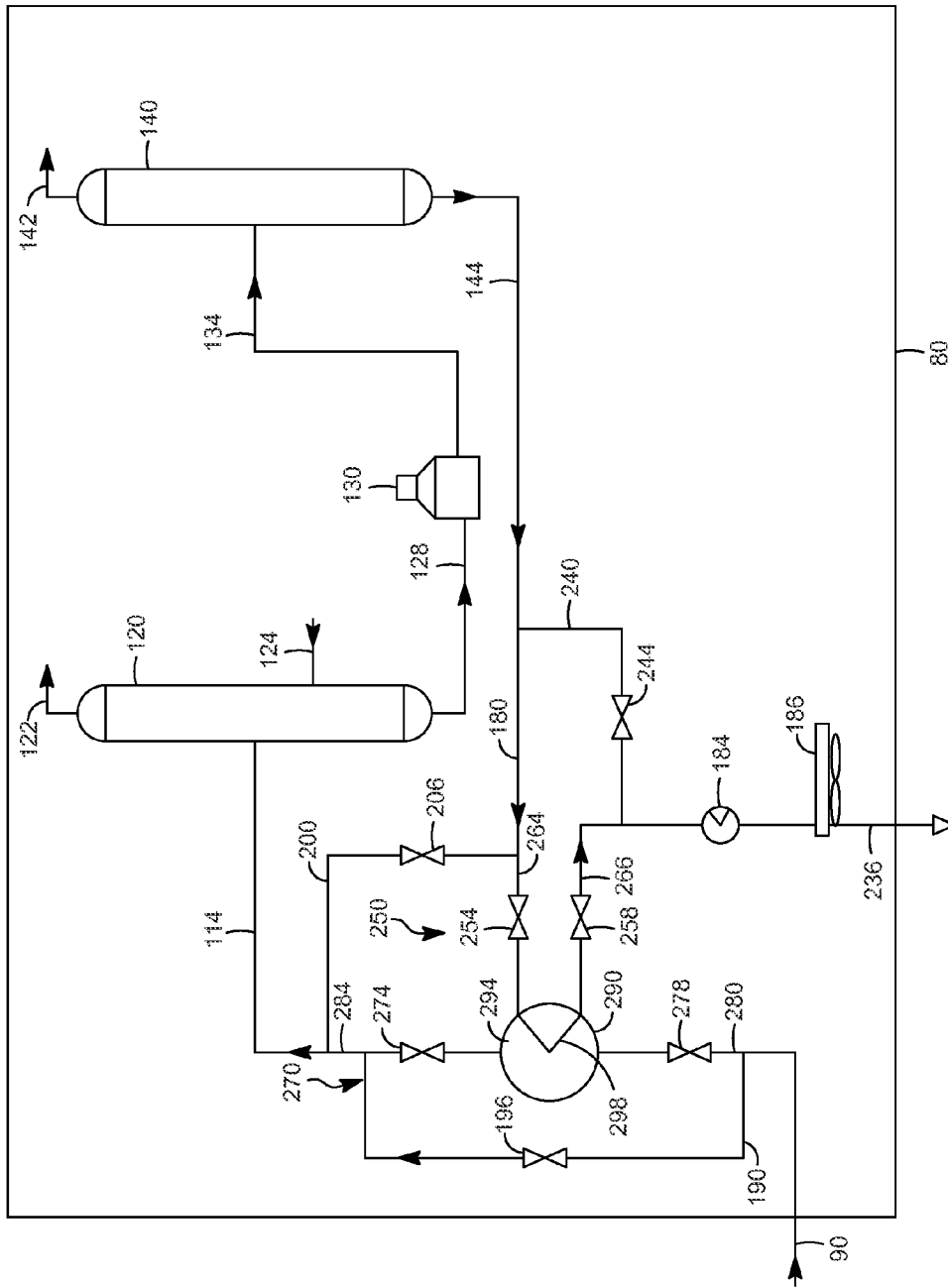
FIG. 2 is a schematic depiction of an exemplary separation apparatus.

Referring to FIG. 2, another version of the exemplary separation apparatus 80 is depicted, which can have a stripper 120, a fractionator charge heater 130, and a fractionator 140 as described above. During normal operations, the bottom stream 144 from the fractionator 140 can pass through a bypass line 240 through the exchanger 184 and the air cooled exchanger 186 and through the line 236 for further processing. This version of the exemplary separation apparatus 80 can include one or more valves 250, in turn, including valves 254 and 258, and another one or more valves 270, in turn, including valves 274 and 278.

During start-up after a shutdown, the stripper 120 and the fractionator 140 can be inventoried with start-up hydrocarbons. The stripper 120 and the fractionator 140 may be started by firing the fractionator charge heater 130 and circulating the start-up hydrocarbons through lines 144, 180, 200, 114, 128, and 134 by having the valves 244, 254, 258, 196, 274, and 278 closed and a valve 206 opened. Often, this circuit is used to heat the stripper 120 and fractionator 140 hydrocarbon inventory in preparation for receiving hydrocarbons from the reactor section. The upstream hydroprocessing reactor can be sulfided with the hydrocarbon carrier including the sulfiding agent flowing to a flash drum. Opening a valve can release the hydrocarbon carrier from the flash drum, and at this point valves 274, 278, 254, and 258 can be opened and valves 196, 206, and 244 can be closed. In this exemplary embodiment, the hydrocarbon carrier can be warmed in the exchanger 290. The hydrocarbon carrier passing in the lines 90 and 280 can enter a shell or cold side 294 of the exchanger 290 and the bottom stream 144 from the fractionator 140 may enter a tube or hot side 298. In other exemplary embodiments, the tubes of the exchanger 290 may be the cold side and the shell of the exchanger 290 may be the hot side. In one preferred embodiment, the hot side 298 is about 240-about 320° C., preferably about 260-about 320° C., and the cold side 294 is about 130-about 200° C., preferably about 150-about 200° C., of the exchanger 290. The hydrocarbon carrier exiting the exchanger 290 can pass through a line 284 and enter as a heated feed 114 to the stripper 120. Preferably, the heated feed 114 is at a temperature of about 175-about 250° C., which can be sufficiently hot enough to separate the hydrogen sulfide in the stripper 120.

The hydrogen sulfide may exit the top of the stripper 120 via a line 122. The heavier liquids can exit the stripper 120 via the bottom line 128 and pass through the fractionator charge heater 130 via a line 134 to the fractionator 140. Lighter hydrocarbons can exit the top of the fractionator 140 via a line 142, and heavier liquids can exit as the bottom stream 144. Generally, sufficient hydrogen sulfide is removed in the stripper 120 such that an amount of hydrogen sulfide of no more than about 0.5 mole ppm, by weight, is present in the stripper bottoms liquid stream 128. Thus, the accumulation of hydrogen sulfide in the top of the fractionator 140 may be minimized. The bottom stream 144 can pass through the hot side 298 of the exchanger 290 and subsequently pass through a line 266 to the exchanger 184 and the air cooled exchanger 186 in the line 236 and may be recycled, as described above, or sent for further processing.

Once a hydrocarbon feed can be provided to the upstream hydroprocessing reactor and the hydroprocessing effluent provided to the separation apparatus 80 at a preselected temperature to the stripper 120, normal operations can be initiated. The hydrocarbon feed can pass through lines 190, 284, and 114 to the stripper 120 by closing the valves 254, 258, 274, and 278 and opening the valves 196 and 244. Once isolated, the exchanger 290 may be taken out of service by being drained, purged, and maintained under a nitrogen atmosphere.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for initiating operations of a separation apparatus, comprising:
    passing a hydrocarbon carrier comprising a sulfiding agent through an exchanger for heating the hydrocarbon carrier prior to entering a stripper; and
    passing a start-up hydrocarbon stream to combine with the hydrocarbon carrier comprising the sulfiding agent prior to entering the stripper.

2. The process according to claim 1, wherein the hydrocarbon carrier is passed through a cold side of the exchanger, and a bottom stream from a fractionation column is passed through a hot side of the exchanger.

3. The process according to claim 2, further comprising passing the hydrocarbon carrier from the stripper to the fractionation column.

4. The process according to claim 3, further comprising heating and circulating the start-up hydrocarbon through the stripper and fractionation column before passing the hydrocarbon carrier through the exchanger.

5. The process according to claim 4, further comprising bypassing the circulated start-up hydrocarbon around the exchanger.

6. The process according to claim 5, further comprising opening one or more valves to a hot side of the exchanger to provide the bottom stream comprising the circulated start-up hydrocarbon thereto.

7. The process according to claim 6, further comprising opening another one or more valves for providing the hydrocarbon carrier to the cold side of the exchanger.

8. The process according to claim 7, further comprising closing one or more valves and another one or more valves and opening a further valve for bypassing the hydrocarbon carrier around the exchanger after providing a hydroprocessed effluent at a preselected temperature to the stripper.

9. The process according to claim 1, further comprising heating the hydrocarbon carrier to a sufficient temperature for minimizing an amount of hydrogen sulfide in a fractionation column.

10. The process according to claim 9, wherein the hydrocarbon carrier is heated to a temperature of about 175-about 250° C.

11. The process according to claim 2, wherein the hot side of the exchanger is about 240-about 320° C.

12. The process according to claim 1, wherein the hydrocarbon carrier is heated to a temperature sufficient to minimize hydrogen sulfide accumulation in a fractionation column downstream of the stripper.

13. A process for initiating operations of a separation apparatus, comprising:

passing at least a portion of a bottom stream from a fractionation column upstream of a stripper to combine with at least a portion of a hydroprocessing effluent to provide a heated feed to the stripper.

14. The process according to claim 13, wherein the bottom stream is split into a first portion combined with the at least a portion of a hydroprocessing effluent forming a stripper feed and a second portion recycled upstream of a hydroprocessing reactor.

15. The process according to claim 13, wherein the feed to the stripper is heated to a sufficient temperature to minimize accumulation of hydrogen sulfide in the fractionation column.

16. The process according to claim 15, wherein the feed is heated to a temperature of about 175-about 250° C.

17. The process according to claim 14, wherein the first portion is throttled via a control valve prior to combination with the another stream to form the feed.

* * * * *